United States Patent
Inahara et al.

(10) Patent No.: US 7,647,892 B2
(45) Date of Patent: Jan. 19, 2010

(54) ANIMAL OR OTHER OBJECT WASHING SYSTEM AND METHOD

(75) Inventors: Mark Keiji Inahara, Seattle, WA (US); Mark Tsuneaki Hidaka, Bainbridge Island, WA (US)

(73) Assignee: Ruff House, Inc., Redmond, WA (US)

( * ) Notice: Subject to any disclaimer, the term of this patent is extended or adjusted under 35 U.S.C. 154(b) by 54 days.

(21) Appl. No.: 12/152,770

(22) Filed: May 16, 2008

(65) Prior Publication Data

US 2008/0282992 A1 Nov. 20, 2008

Related U.S. Application Data

(62) Division of application No. 10/766,544, filed on Jan. 27, 2004, now Pat. No. 7,389,747.

(51) Int. Cl.
*A01K 13/00* (2006.01)
(52) U.S. Cl. ..................... 119/668; 119/651
(58) Field of Classification Search ............ 119/668, 119/651, 665, 666, 667, 670
See application file for complete search history.

(56) References Cited

U.S. PATENT DOCUMENTS

| | | | | |
|---|---|---|---|---|
| 3,713,423 A * | 1/1973 | Sparr, Sr. ............... 119/670 |
| 4,332,217 A | 6/1982 | Davis |
| 4,366,081 A * | 12/1982 | Hull .................. 366/101 |
| 5,230,368 A * | 7/1993 | Berfield ............... 137/889 |
| 5,269,444 A * | 12/1993 | Wright ................ 222/190 |
| 5,448,966 A | 9/1995 | McKinnon et al. |
| 5,493,996 A | 2/1996 | Verschuere et al. |
| 5,535,700 A * | 7/1996 | Boudreau ............. 119/651 |
| 5,540,362 A * | 7/1996 | Azuma et al. .......... 222/642 |
| 5,673,650 A | 10/1997 | Mottram et al. |
| 5,711,251 A | 1/1998 | Green et al. |
| 5,722,350 A * | 3/1998 | Marshall .............. 119/673 |
| 5,826,546 A * | 10/1998 | Epstein ............... 119/651 |
| 6,293,294 B1 * | 9/2001 | Loeb et al. ............ 137/1 |
| 6,302,058 B1 * | 10/2001 | Dahl et al. ........... 119/14.47 |
| 6,345,592 B1 | 2/2002 | Hollis |
| 6,443,164 B1 | 9/2002 | Parker et al. |
| 6,446,578 B1 | 9/2002 | Irwin |
| 6,688,257 B2 | 2/2004 | Lee |
| 6,752,102 B2 | 6/2004 | Dahl et al. |
| 7,387,086 B2 * | 6/2008 | Hakes ................ 119/652 |
| 7,458,523 B2 * | 12/2008 | Hyslop ............... 239/67 |
| 2003/0024485 A1 | 2/2003 | Freidell |

* cited by examiner

*Primary Examiner*—Yvonne R. Abbott
(74) *Attorney, Agent, or Firm*—Paul F. Rusyn; Graybeal Jackson LLP (57) ABSTRACT

A method of washing an object using a pressurized water source includes combining a cleaning fluid and the pressurized water and diffusing pressurized air into the combined cleaning fluid and pressurized water. The combined cleaning fluid and pressurized water diffused with the pressurized air is applied to the object. The cleaning fluid may also be carbonated and combined with the pressurized water prior to diffusing pressurized air into this combined mixture. The object being washed may, for example, be an animal such as a dog.

10 Claims, 4 Drawing Sheets

ANIMAL OR OTHER OBJECT WASHING SYSTEM AND METHOD

PRIORITY CLAIM

This application is a divisional application of prior application Ser. No. 10/766,544, which was filed Jan. 27, 2004 and the benefit of the filing date of which is hereby claimed under 35 U.S.C. § 120, and which is incorporated herein by reference.

TECHNICAL FIELD

The present invention relates generally to washing systems, and more specifically to systems and methods for washing animals or other objects.

BACKGROUND

Animals are typically washed by hand, with a person manually applying water, shampoos, and other cleaning products such as conditioners to wash the animal. Hand washing is a labor intensive process that is slow and does not produce uniform results among animals. As a result, a variety of different types of devices have been developed to assist person in washing an animal. For example, some conventional systems utilize a recirculation pump positioned at a bottom of a tub in which an animal is bathed to assist a person in bathing the animal by mixing the water and shampoo or other cleaning product. In such a system, the shampoo or conditioner is poured into the tub along with water, and the pump is activated to combine the water and shampoo or conditioner and pump the combined mixture through a hose and onto the animal.

These types of recirculating systems typically reduce the amount of cleaning product utilized in washing an animal since product that flows off the animal is recirculated and once again placed on the animal. A recirculating system can make very efficient use of shampoo. For example, in a typical recirculating system at least 1.5 inches of water is required at the bottom of a tub to provide sufficient solution for cleaning. Shampoo is added to the standing water in the tub at the recommended rate of approximately ½ ounce per gallon of water. The interior of the tub must not be much larger than the dog being washed to achieve efficient shampoo usage.

Another potential drawback of a recirculating system is the "look and feel" of the dispensed shampoo solution. Although recirculating systems may clean effectively, there is very low sudsing and the cleaning solution lacks the slippery soapy feel that the most people equate with effective cleaning. Due to this factor, additional scrubbing with a rubber brush or hand massaging may not be desired. The primary method of cleaning in this type of system is to use the shampoo solution flow from the sprayer to wash debris from the coat. Some people, however, do not like these systems due to the fact that dirty water may be put back on the animal during the washing process. Furthermore, in such systems shampoo and other cleaning products must be manually dispensed, requiring a person to physically select shampoo containers, measure and dispense the desired products from such containers.

Figure 1:
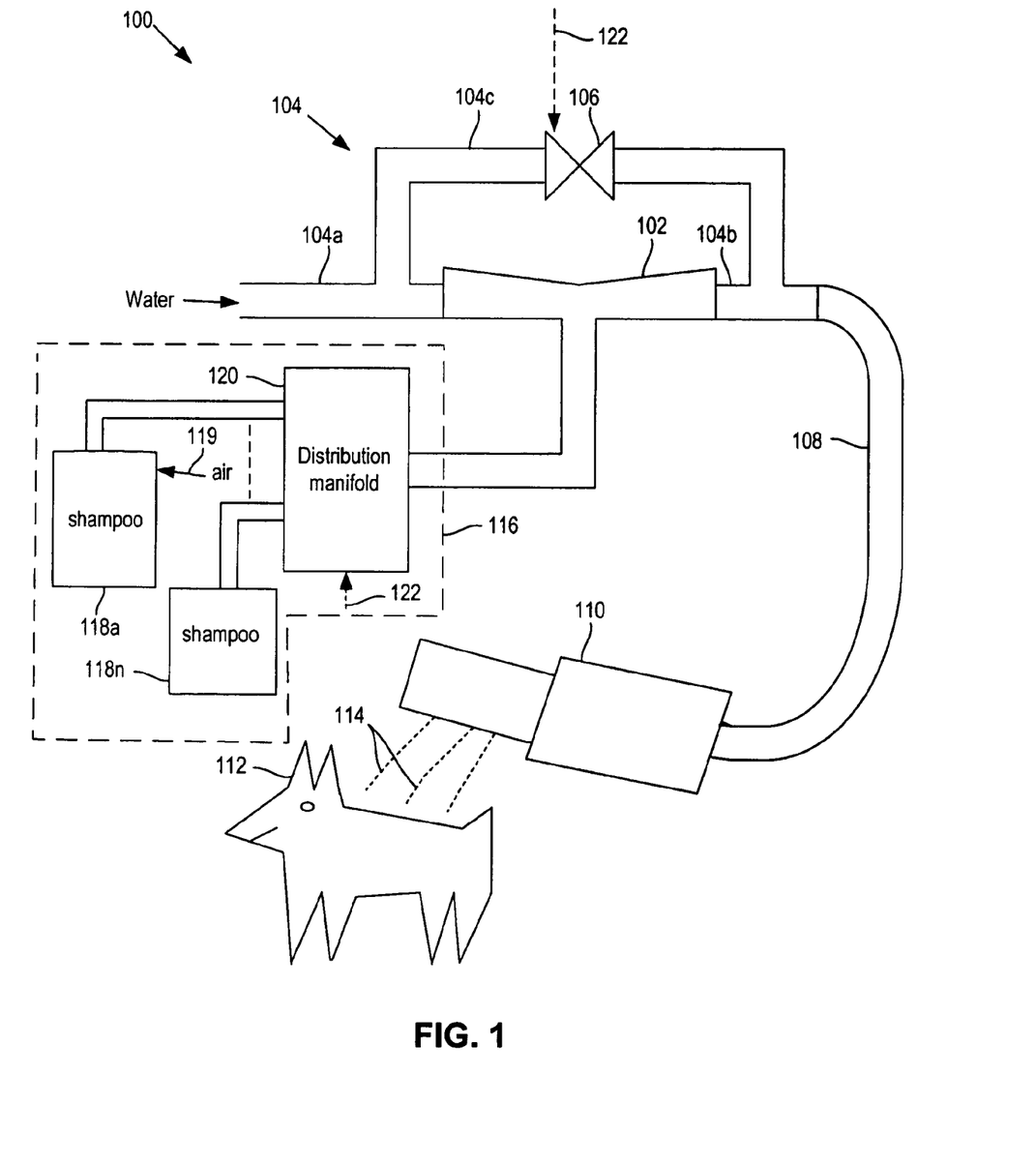
FIG. 1 is a functional block diagram showing a portion of one type of conventional animal washing system.

Another type of washing system uses water on a once-through basis. FIG. 1 is a functional block diagram of a portion of a conventional non-recirculating washing system 100 that includes a siphon mixer 102 for injecting a desired shampoo into a water flow through a water containment assembly 104. The water containment assembly 104 includes an inlet portion 104a through which the water flows into the mixer 102, an outlet portion 104b through which a mixture of shampoo and water flows from the injector, and a bypass portion 104c that bypasses the injector to provide pure water during rinsing of the animal. The bypass portion 104c includes a bypass valve 106 that is turned on to bypass the mixer 102 and output pure water from the outlet portion 104b. The pure water from the bypass portion 104c or water-shampoo mixture from the outlet portion 104b flow through a flexible tube 108 and into a spray unit 110. A person (not shown) positions the spray unit 110 near an animal 112 being bathed to direct streams 114 of water or the water-shampoo mixture onto the animal 112.

The washing system 100 further includes a soaping system 116 having a number of shampoo containers 118a-118n, each shampoo container holding a different shampoo that may be selected by a person. Each shampoo container 118a-118n is coupled to a distribution manifold 120 that supplies the shampoo from a selected container to the mixer 102 in response to selection inputs 122. The selection inputs 122 may correspond to a knob that a person turns to one of multiple positions, and at each position of the knob the distribution manifold 120 couples a corresponding shampoo container 118a-118n to the mixer 102. Each of the shampoo containers 118 may receive pressurized air 119 to help the shampoo more easily flow from the container and through the distribution manifold 120 to the mixer 102, such as when the shampoo is very viscous. The selection inputs 122 are also applied to the bypass valve 106, and once again may correspond to a knob having a first position to turn off the valve and a second position to turn on the valve.

In operation, a person places the animal 112 to be bathed into a tub (not shown) near the system 100 and thereafter applies the selection inputs 122 to the distribution manifold 120 provide the desired shampoo from the containers 118 to the mixer 102. Initially, the person also applies the selection inputs 122 to the valve 106 to turn on the valve and thereby eliminating the siphoning action at the mixer 102 so that pure water is applied through the portions 104a-104c and 104a-104b, flexible tube 108, and spray unit 110 onto the animal 112. Once the animal 112 is wet, the person applies the selection inputs 122 to turn off the valve 106 so the pure water flows through the inlet portion 104a, through the mixer 102 to 104b. In response to this flow of water, sufficient differential pressure develops between points in the mixer 102 that causes the selected shampoo to be injected through the distribution manifold 120 and into the flow of water through the injector to thereby create a water-shampoo mixture.

This water-shampoo mixture flows through the outlet portion 104b, flexible tube 108 and spray unit 110 onto the animal 112. The person applies the desired amount of the water-shampoo mixture to the animal 112 and then physically massages the mixture into the animal's coat to wash the animal. Once the animal has been washed, the person once again applies the selection inputs 122 to turn on the bypass valve 106 so that pure water is sprayed from the spray unit 110 to rinse the animal 112. Note that when the bypass valve 106 is turned on, water flows from the inlet portion 104a through the bypass portion 104c and any water flow through the mixer 102 does not generate the required differential pressure to inject the selected shampoo. In this way, pure water flows from the outlet portion 104b to rinse the animal.

In the washing system 100, the mixer 102 mixes shampoo and water to develop the desired water-shampoo mixture to be sprayed onto the animal 112. The shampoo must be well mixed with the water to develop a consistent solution that uniformly cleans the animal. Some shampoos, such as more viscous shampoos, may be difficult to effectively mix with the mixer 102. The mixer 102 is a siphon mixer that uses the Venturi effect to induce a vacuum dependent upon differential pressure between the inlet and outlet of the mixer for the pickup or intake of shampoo. Some bathing systems use this type of passive siphon action to inject ambient air into the water-shampoo mixture to create additional bubbling. There are modified versions of the system 100 that include the addition of a passive siphon air injection system which can dispense a bubblier shampoo mixture than recirculating bathing systems. The mild increase in suds is in large part attributed to the higher concentration of shampoo used in most non-recirculating bathing systems. The primary benefit of this modest level of bubbling is cosmetic since even at very high shampoo concentrations most of the water-shampoo mixture in conventional non-recirculating systems quickly flows off the coat of the animal 112, and down the drain before the shampoo's full effectiveness is utilized. This problem is magnified when washing animals with short coats. Conventional bathing systems are not engineered to create the dense foamy lather that possess the required functional properties to readily adhere to a dog's coat and make efficient use of shampoo.

There is a need for an animal bathing system that uses water on a once-through basis that combine the best features of conventional recirculating and non-recirculating bathing systems without incorporating the potential drawbacks of each.

SUMMARY

According to one aspect of the present invention, a method of washing an object using a pressurized water source includes combining a cleaning fluid and the pressurized water and diffusing pressurized air into the combined cleaning fluid and pressurized water. The combined cleaning fluid and pressurized water diffused with the pressurized air is applied to the object. The cleaning fluid may also be carbonated and combined with the pressurized water prior to diffusing pressurized air into this combined mixture. The object being washed may, for example, be an animal such as a dog.

DETAILED DESCRIPTION

Figure 2:
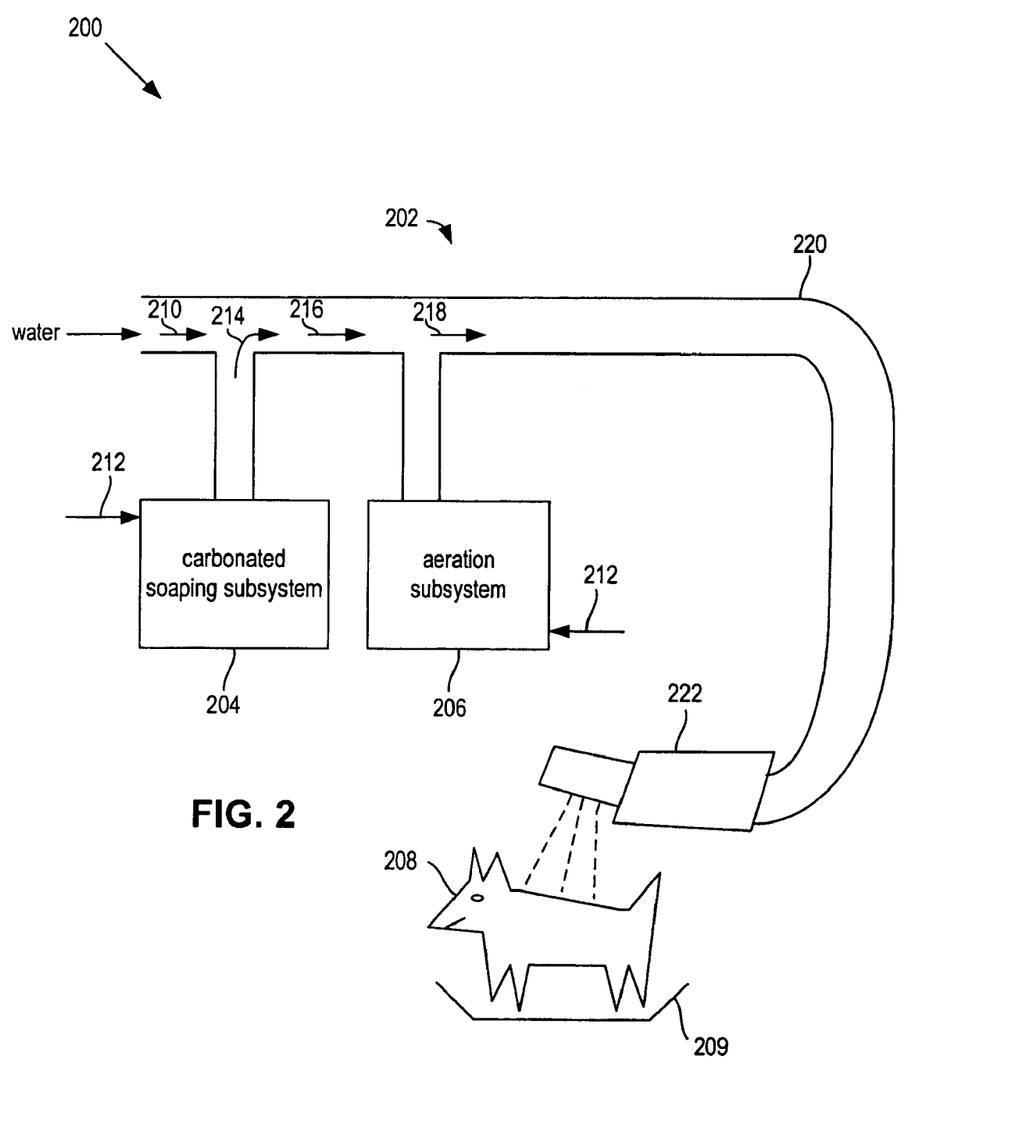
FIG. 2 is a functional diagram of an animal washing system according to one embodiment of the present invention.

FIG. 2 is a functional diagram of an animal washing system 200 including a cleaning subsystem 202 that receives carbonated shampoo from a carbonated soaping subsystem 204 and includes an aeration subsystem 206 for diffusing air into aerating a water and carbonated shampoo mixture flowing through the cleaning subsystem. In operation, the carbonated soaping subsystem 204 provides carbonated shampoo to the cleaning subsystem 202 and the aeration subsystem 206 aerates the water and carbonated shampoo mixture flowing through the cleaning subsystem to thereby supply a water and carbonated shampoo mixture for bathing an animal 208, as will be explained in more detail below. The carbonated shampoo from the carbonated soaping subsystem 204 is stickier and lathers and cleans better than noncarbonated shampoos. Moreover, the carbonated shampoo allows a wide variety of shampoos to be efficiently utilized in the washing system 200, such as oatmeal shampoos which do not contain commonly used surfactants, low lathering shampoos, and shampoos that are highly diluted. In addition, the aeration subsystem 206 forces micro-bubbles into the shampoo mixture to greatly enhance the lathering characteristics of this mixture, which optimizes utilization of the shampoo and improves cleaning of the animal 208 being bathed. Due to the aeration subsystem 206, very little of the shampoo is wasted or lost in the system 200 due to the stickiness of the lather and the ability to easily see where the shampoo has been applied, which will be referred to as the "opaqueness" of the dispensed shampoo in the following description. Moreover, although the embodiment of the system 200 in FIG. 2 includes both the carbonated soaping subsystem 204 and aeration subsystem 206, the system may include only the aeration subsystem or only the carbonated soaping subsystem in other embodiments of the present invention.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and the components of such embodiments are within the scope of the present invention. Embodiments including fewer than all the components of any of the respective described embodiments may also be within the scope of the present invention although not expressly described in detail below. Also, in the following description the operation of well known components and/or processes has not been shown or described in detail below to avoid unnecessarily obscuring the present invention. The term shampoo as used herein is intended to be interpreted broadly to include any type of cleaning fluid or other bathing product such as conditioners that are suitable to particular applications of the system 200.

Pure water is supplied to the cleaning subsystem 202 at the left side of the subsystem in FIG. 2, with this pure water flow through the cleaning subsystem being indicated with an arrow 210. As use herein, the term "pure water" is used to indicate water that includes substantially no shampoo. Also, the pure water would typically be supplied through a thermostatic mixing valve (not shown) to provide water at a desired temperature. The carbonated soaping subsystem 204 carbonates a variety of different shampoos (not shown), and in response to selection inputs 212 the soaping subsystem injects a selected one of the carbonated shampoos into the pure water flow 210 as indicated by an arrow 214. The selection inputs 212 may, for example, correspond to a switch, knob or a button on a keypad that a user controls to select the desired carbonated shampoo and to terminate injection of the selected shampoo, such as during a rinsing mode of operation, which will be discussed in more detail below. The mixture of the pure water flow 210 and the selected carbonated shampoo 214 is indicated with an arrow 216, and may simply be referred to as a water-carbonated-shampoo mixture in the following description. The aeration subsystem 206 thereafter aerates the water-carbonated-shampoo mixture 216 by diffusing air into the mixture to develop an aerated-water-carbonated-shampoo mixture as indicated by an arrow 218. The aeration subsystem 206 is activated and deactivated in response to the selection inputs 212, as will be described in more detail below. The cleaning subsystem 202 further includes a flexible hose 220 coupled to a spray unit 222 through which the aerated-water-carbonated-shampoo mixture or pure water is applied to the animal 208.

In operation, the system 200 operates in one of three modes: a carbonation mode, a soaping mode, and a rinsing mode. During the carbonation mode, the carbonated soaping subsystem 204 operates to carbonate a variety of different shampoos that may be selected by a user of the washing system 200. This process is transparent to users of the washing system 200, and may be occur, for example, when the system is not operating when a place of business at which the system is located is closed. Moreover, the carbonated shampoos generated by the subsystem 204 would typically be stored in storage tanks (not shown) and in one embodiment the subsystem includes reserve and production tanks which allow one set of tanks to be used while the other set is charging (i.e., shampoo is being carbonated), as will be explained in more detail below.

Once carbonated shampoo is produced during the carbonation mode, the system 200 operates in the soaping and rinsing modes. Typically, a user would initially place the system 200 in the rinsing mode to wet the animal 208 prior to applying any cleaning products to the animal. The user first applies the selection inputs 212 to place the system 200 in the rinsing mode of operation, and during this mode the carbonated soaping subsystem 204 is deactivated while the aeration subsystem 206 continues operating, except during a face wetting/rinsing submode that will be discussed in more detail below. As a result, the pure water flow 210 input to the cleaning subsystem 202 flows through the flexible tube 220 and spray unit 222 and is applied to the animal 208 by the user. Because the carbonated soaping subsystem 204 is deactivated, the pure water flow 210 does not receive any carbonated shampoo The rinsing mode of operation is thus used to pre-wet the animal 208 before any shampoo is applied and after the animal 208 has been washed to rinse shampoo off the animal. The rinsing mode also includes a low-flow, no aeration water only face wetting/rinsing submode as previously mentioned. The face wetting/rinsing submode is used in conjunction with a separately provided "no-tears" type shampoo in a dispenser (not shown in FIG. 2) mounted to a wall of a tub 209 in which the animal 208 is being bathed, as will be discussed in more detail below. This is important since all shampoos dispensed from the soaping subsystem 204 may not be of the "tearless" type.

Once the animal 208 has been wetted as desired, the user applies the selection inputs 212 to place the system 200 into the soaping mode of operation. In response to the selection inputs 212, the carbonated soaping subsystem 204 and aeration subsystem 206 are activated and the desired carbonated shampoo is selected. The user then positions the flexible hose 220 and spray unit 222 as required to apply the aerated-water-carbonated-shampoo mixture 218 to the animal 208. Once the desired amount of the aerated-water-carbonated-shampoo mixture 218 is applied to the animal 208, the user would typically physically wash the animal and thereafter once again place the system 200 into the rinsing mode of operation to rinse the aerated-water-carbonated-shampoo mixture off the animal and complete the washing process.

In the system 200, the rinsing mode includes the low flow non-aerated face wetting/rinsing submode for washing the face of the animal 208. The typical sequence for the overall operation of the system 200, which the user controls via the selection inputs 212, is as follows: 1) place the system in the aerated rinsing mode and pre-wet the animal (except head and face of the animal) 208; 2) place the system in the soaping mode and apply shampoo to the animal (except head and face of the animal); 3) work-in the shampoo applied to the animal to thereby wash the animal; 4) once again place the system in the aerated rinsing mode and rinse the shampoo off of the animal; 5) place the system in the face wetting/rinsing submode to prewet the face of the animal; 6) apply no-tears shampoo manually to the animal from the dispenser (not shown) mounted near the tub 209; and 7) rinse head and face of the animal with the system still in the face wetting/rinsing submode. In the face wetting/rinsing submode of operation, the system 200 provides a low pressure and low flow stream of pure water and the subsystems 204, 206 provide no aeration or shampoo during this submode of operation.

The aerated-water-carbonated-shampoo mixture 218 produced and used by the system 200 for washing the animal 208 greatly enhances the lathering qualities of the shampoo being utilized, which optimizes application of the shampoo and improves cleaning of the animal 208 being bathed. By carbonating the shampoo being applied to the animal 208, the shampoo becomes stickier, lathers better and provides cleaning action by lifting foreign materials from the coat as carbon dioxide escapes from solution. The carbonation allows a wide variety of shampoos to be efficiently utilized in the washing system 200. Similarly, the aeration of the water-carbonated-shampoo mixture 216 efficiently mixes this mixture and creates dense lather by forcing micro-bubbles into solution using compressed air which further improves utilization of the shampoo and improves cleaning of the animal 208. The pressurized delivery of the actively foaming shampoo solution from the spray unit 222 projects the mixture 218 solution deep into a coat of the animal 208, and is effective in deep cleaning animals with long or thick coats.

The washing system 200 requires considerably less shampoo per wash than the system 100 and can be more efficient than a recirculating system due to it's ability to easily scale shampoo use to match the dog's size and coat. This is attributed to the high volume of lather created by force aerating with compressed air the carbonated cleaning mixture which greatly enhances the stickiness of the shampoo mix being dispensed. Most of the resulting lather remains on the coat for manual scrubbing even on animals with short coats. Moreover, due to the opaqueness of the dispensed aerated-water-carbonated-shampoo mixture 218, it is easy to see where the solution has been applied making the washing process easier and faster. This feature of the system 200 is advantageous, for example, when the system 200 is utilized in a business such as a dog wash or grooming facility where less time is required to clean each animal 208, thus increasing production.

By carbonating the shampoos used in the system 200, bacterial and fungal growth is inhibited in storage tanks (not shown) containing the carbonated shampoo, which extends the useful life of shampoos that do not include preservatives to prevent such growth. Moreover, the carbonation in the shampoo and aeration of this shampoo helps lift dirt, parasites, dander, and oils from deep inside the coat of the animal 208, and aids in better soil suspension for rinsing such dirt from the animal. The carbonation and aeration also help liberate the fragrance from the shampoo, making the animal smell better.

In the system 200, the viscosity and stickiness of the mixture 218 dispensed from the spray unit 222 can be adjusted to range from a dense dry foam (like shaving cream) to soapy water, which gives the system enough flexibility to be adjusted for variations in water hardness, incoming water pressure, shampoo properties, and customer preferences. In many applications, a dense, wet, foamy lather from the mixture 218 is optimal since it sticks well to short-haired animals 208, is wet enough to penetrate long dense coats of long-haired animals, and is slippery enough for manual scrubbing of the animal with a brush or by hand once the mixture is applied. Individual dial settings can be used to dispense shampoo with optimal properties for short coats and another for long coats if preferred.

The result is that less shampoo is required per wash when compared to other conventional methods of washing. The amount of shampoo used is easily scaled to match the need based upon the size and type of coat of the animal. Moreover, with the system 200 it is easy for a user to see where the shampoo is being applied to the animal 208 due to the opaque, dense lather of the mixture 218 that sticks to the coat of the animal. Applying a shampoo mixture of this consistency has often been described as "painting the coat" due to the properties described. This allows the mixture 218 to be dispensed at the proper dilution to all parts of the coat of the animal 208 and facilitates uniform rinsing of mixture from the coat. The dispensing of properly diluted mixture by the system 200 also minimizes the potential for animal 208 and user skin sensitivity reactions when compared to using the fully concentrated shampoos in the conventional manual method of washing. All these factors reduce the time required to wash the animal 208, and users especially like the look and feel of large volumes of actively foaming lather being dispensed from the sprayer unit 222 onto their animal.

Passive air injection systems that rely upon differential pressure to create suction to draw in ambient air (which require no external power source or compressed air) are unable to generate the required conditions to aerate a shampoo solution to optimal consistency. The system 200 can be adjusted to achieve 1) An air to washing solution volume ratio greater than 40% 2) such ratio when back-pressure is higher than 40% of water inlet pressure (water inlet range 30 psi-90 psi) 3) such ratio where the inlet 300 water flow can range from 0.4 gpm to 1.6 gpm. 4) a dense lather/foam consistency by injection of extremely fine bubbles by the use of diffusing media 340, 364, 366 of sub-micron porosity. Active forced aeration through the use of pressurized air is a way to economically generate large volumes of small bubbles to create the dense foamy lather that sticks readily to the animal's coat. The passive Venturi type systems that introduce air into a shampoo solution to enhance sudsing do not attain optimal shampoo consistency due to the inherent limitations of a passive pressure differential system. Limitations are: inability to achieve high air to washing solution volume ratios, ineffective under low differential pressure conditions (difference in pressure between inlet and outlet), inability to infuse large volume of micro-bubbles into solution, and inability to adjust injected air volume independent of water flow and water pressure. In the system 200 a very viscous, sticky and foamy consistency is required to make efficient use of shampoo across all types of coats and sizes of animals. To attain optimal shampoo consistency the soaping system 200 employs an active aeration system using compressed air directed through extremely fine diffusing media into solution to create high volumes of fine lathering shampoo solution. This resultant shampoo solution readily clings to all types of coats including short hair coats of dogs, horses, livestock, and nearly any other type of pet.

Figure 3:
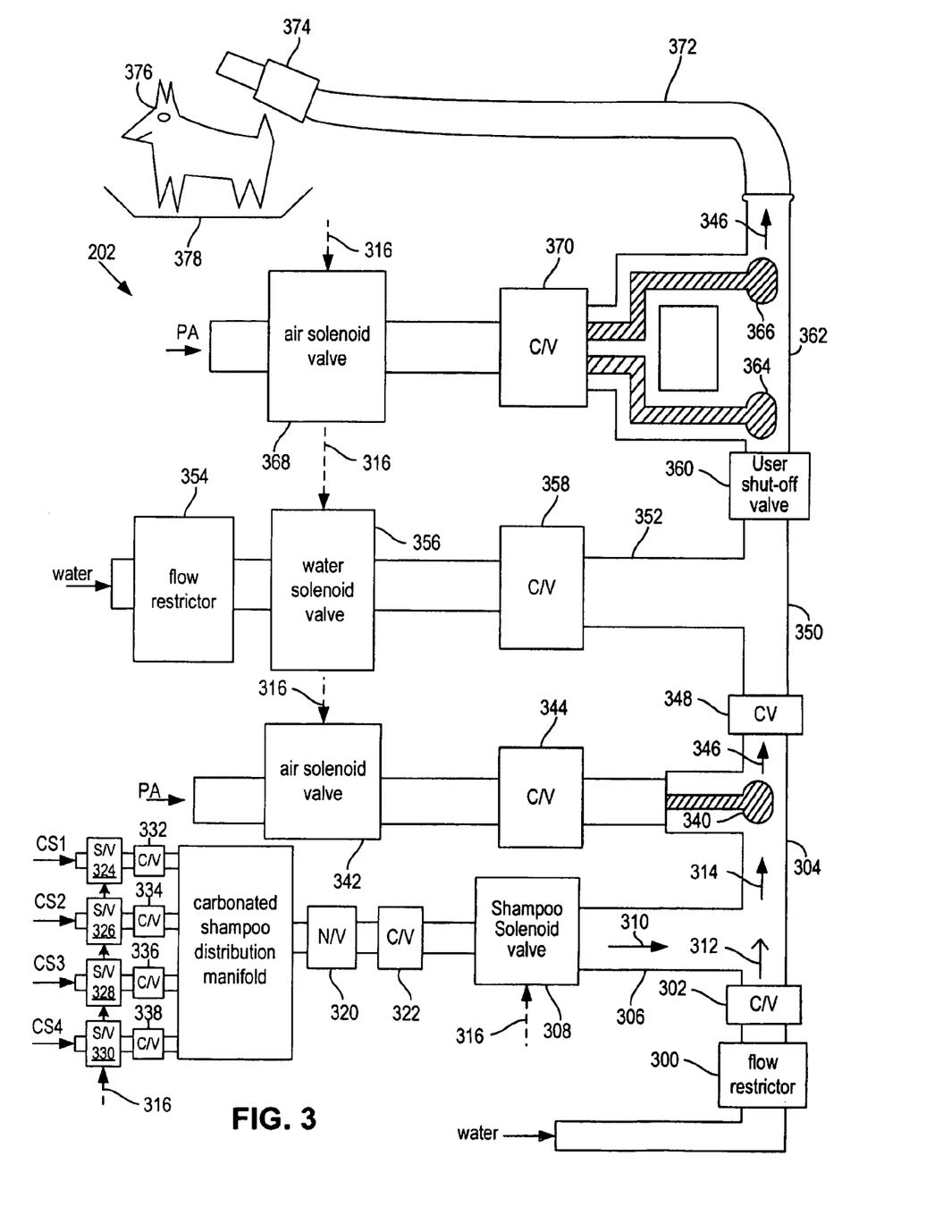
FIG. 3 is a more detailed functional diagram of the cleaning subsystem of FIG. 2 according to one embodiment of the present invention.

FIG. 3 is a more detailed functional diagram of the cleaning subsystem 202 of FIG. 2 according to one embodiment of the present invention. In this embodiment, pure water is input through a flow restrictor 300 to limit the flow rate of the water, and this reduced water flow is, in turn, supplied through a check valve 302 to an injector and aeration assembly 304. The check valve 302 permits the flow of water in only one direction, as will be understood by those skilled in the art. The cleaning subsystem 202 includes a number of check valves, and the function of each such check valve is to permit the flow of water in only one direction and thereby prevent the backflow of water. Therefore, in the following description check valves contained in the subsystem 202 will be mentioned but, for the sake of brevity, the operation of each such check valve will not be described in more detail.

The injector and aeration assembly 304 includes a shampoo input port 306 that is coupled to a shampoo solenoid valve 308 to receive carbonated shampoo, which is represented by an arrow 310. The carbonated shampoo 310 is injected into the water flowing into the assembly 304, which is represented by an arrow 312, to generate a water-carbonated-shampoo mixture 314 indicated by an arrow 314. The shampoo solenoid valve 308 is controlled in response to selection inputs 316 applied by a user of the washing system 200. The selection inputs 316 may be generated, for example, in response to the user positioning a knob or depressing a key to select a desired carbonated shampoo. The carbonated shampoo is supplied to the solenoid valve 308 from a distribution manifold 318 through a needle valve 320 and a check valve 322. The needle valve 320 allows the amount of carbonated shampoo being supplied to the solenoid valve 308 to be adjusted, such as to adjust a flow rate of the carbonated shampoo as a function of the water flow 312 in the assembly 304.

In the embodiment of FIG. 3, the distribution manifold 318 receives four carbonated shampoos designated CS1-CS4, each carbonated shampoo being supplied to an input port of the manifold through a corresponding solenoid valve (S/V) 324-330 and check valve 332-338. The solenoid valves 324-330 are activated in response to the selection inputs 316, with only one of the solenoid valves being open at a time to supply the corresponding carbonated shampoo CS1-CS4 to the distribution manifold 318. For example, if the selection inputs 316 indicate a user has selected the carbonated shampoo CS1, the solenoid valve 324 is opened while the solenoid valves 326-330 are closed. In this situation, the carbonated shampoo CS1 is applied through the open solenoid valve 324, check valve 332 and distribution manifold 318 to the needle valve 320. Note that the distribution manifold 318 provides carbonated shampoos CS1-CS4 supplied to its input ports to the needle valve 320, but that only one shampoo is supplied to a corresponding input port at a time due to only one of the solenoid valves 324-330 being open.

Returning now to the injector and aeration assembly 304, the assembly further includes a fine aeration media 340 that receives pressurized air PA supplied through an air solenoid valve 342 and a check valve 344. The air solenoid valve 342 receives the selection inputs 316, and in one embodiment the solenoid is turned on during the rinsing mode of operation. As the water-carbonated-shampoo mixture 314 flows past the fine aeration media 40, the mixture is aerated, generating an aerated-water-carbonated-shampoo mixture indicated by an arrow 346. The mixture 346 has enhanced lathering qualities as will be discussed in more detail below. The aerated-water-carbonated-shampoo mixture 346 thereafter flows through a check valve 348 and into a rinse water assembly 350. Water is supplied to a rinse port 352 of the assembly 350 through a flow restrictor 354, water solenoid valve 356, and check valve 358. The solenoid valve 356 is controlled in response to selection inputs 316, with the valve being opened during the rinse mode of operation, and closed during the face wetting/ rinsing submode and the soaping mode of operation. The flow restrictor 354 may be sized differently than the flow restrictor 300, and in one embodiment the restrictor 354 allows a greater flow rate than does the restrictor 300 such that the subsystem 202 provides a greater flow rate during the rinsing mode of operation.

Either the mixture 346 or water flows from the assembly 350 and through a user shut-off valve 360 into an aeration assembly 362. A user may use the shut-off valve 360 to adjust the flow of water or the aerated-water-carbonated-shampoo mixture from the subsystem 202. The aeration assembly 362 includes two aeration media 364, 366 that receive pressurized air PA supplied through a solenoid valve 368 and check valve 370. The solenoid valve 368 is controlled responsive to the selection inputs 316, being open during both the washing and rinsing mode and closed only in the face wash mode. The aerated-water-carbonated-shampoo mixture 346 is further aerated as it flows past the air aeration media 364, 366, and this mixture is once again designated with an arrow 346 as it flows from the assembly 362 and thereafter flows through a flexible tube 372 and a spray unit 374 onto an animal 376 being bathed in a tub 378. Although not expressly discussed, the components in the subsystem 202 are connected where required through suitable plastic tubing or pipes as shown in some instances in FIG. 3 and as will be appreciated by those skilled in the art.

In operation, the user initially applies the selection inputs 316 to place the cleaning subsystem 202 into the rinsing mode of operation. In response to these selection inputs 316, the shampoo solenoid valve 308 and the individual shampoo solenoid valves 324, 326, 328, 330 close to prevent the injection of shampoo into the water flow 312, and the air solenoid valve 342 closes to reduce the aeration of water flowing through the subsystem 202. At the same time, the water solenoid valve 356 opens in response to the selection inputs 316 so the pure water flows through the solenoid valve subject to the flow restrictor 354 and thereafter through the components 350, 360, 362, 372, and 374 and onto the animal 376 to wet the animal prior to applying cleaning products to the animal.

After the animal 376 has been wetted, the user applies the selection inputs 316 to place the cleaning subsystem 202 into the soaping mode of operation. In response to the selection inputs 316, the shampoo solenoid valve 308 and air solenoid valve 342 opens while the water solenoid valve 356 closes. The selection inputs 316 also include a selection of one of the four carbonated shampoos CS1-CS4, and in response to these inputs the corresponding one of the solenoid valves 324-330 turns on while the other three of the solenoid valves remain closed. At this point, the selected one of the carbonated shampoos CS1-CS4 flows through the corresponding solenoid valve 324-330, distribution manifold 318, and shampoo solenoid valve 308, and the selected carbonated shampoo 310 is injected into the water flowing 312 in the assembly 304. The water-carbonated-shampoo mixture 314 is thereafter aerated as it flows over the aeration media 340, 364, 366, and the aerated-water-carbonated-shampoo mixture 346 thereafter out the flexible tube 372 and spray unit 374 onto the animal 376. The mixture 346 applied to the animal 376 may then be manually massaged into the animal to thereby clean the animal, and the user with thereafter once again apply the selection inputs 316 to the subsystem 202 to place the subsystem in the rinsing mode of operation and rinse the applied mixture off the animal.

Figure 4:
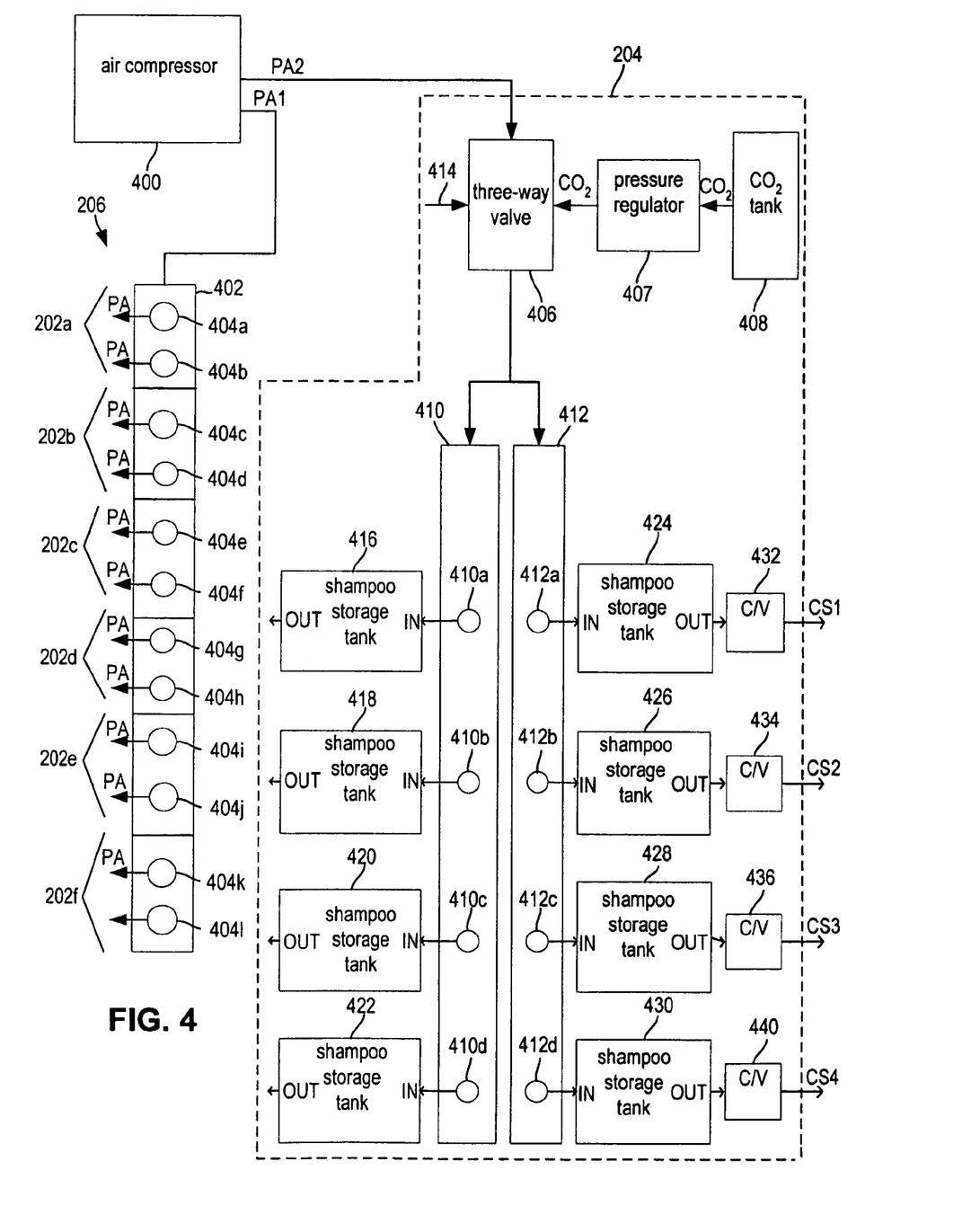
FIG. 4 is a more detailed functional diagram illustrating portions of the carbonated soaping and aeration subsystems of FIG. 2 according to one embodiment of the present invention.

FIG. 4 is a more detailed functional diagram illustrating portions of the carbonated soaping subsystem 204 and aeration subsystem 206 of FIG. 2 according to one embodiment of the present invention. The aeration subsystem 206 includes an air compressor 400 having a pressure regulator (not shown) that supplies pressurized air PA1 at a first pressure to an air distribution block 402. In one embodiment, the pressure of the air PA1 is 60 pounds per square inch (psi). The air distribution block 402 includes 12 output ports 404a-404l arranged in pairs, with each pair of output ports being coupled to an individual cleaning subsystem 202 of FIG. 3. Each output port 404a-404l includes an air flow metering valve (not shown) for controlling air flows to the solenoid valves 342, 368, which may differ. In FIG. 4, each pair of output ports 404a-404l is shown as supplying two sources of pressurized air designated PA to a corresponding cleaning subsystem 202a-202f, were each of the subsystems 202a-202f corresponds to the subsystem 202 of FIG. 3. For example, referring to FIGS. 3 and 4 the output port 404a may be coupled to the air solenoid valve 342 and the output ports 404b coupled to the air solenoid valve 368 in the subsystem 202a. In this way, the aeration subsystem 206 in the embodiment of FIG. 4 provides pressurized air PA1 that is supplied through the air distribution block 402 to up to six cleaning subsystems 202. The number of output ports 404 in the air distribution block 402 may of course be varied to supply pressurized air PA1 to more or fewer cleaning subsystem's 202.

Referring to FIG. 4, the air compressor 400 also provides pressurized air PA2 at a second pressure, which is 80 psi in one embodiment. The carbonated soaping subsystem 204 includes a three-way valve 406 that receives the pressurized air PA2 on a first input port and receives pressurized carbon dioxide CO2 via a pressure regulator 407 from a CO2 tank 408. The three-way valve 406 supplies either the pressurized air PA2 or the CO2 to two distribution blocks 410 and 412 in response to a selection input 414 applied to the valve, which would typically correspond to a rotary switch that is turned by an operator. Each distribution block includes four ports designated 410a-410d and 412a-412d, respectively, with either the air PA2 or CO2 being supplied from each port. Each of the ports 410a-d and 412a-d is coupled to an input port IN of a corresponding shampoo storage tank 416-430 for processing and storing carbonated shampoo, as will be described in more detail below. Each shampoo storage tank 416-430 further includes an output port OUT, with the output ports of the storage tanks 424-430 being coupled through check valves 432-440, respectively, to supply the carbonated shampoos CS1-CS4. In the embodiment of FIG. 4, the carbonated shampoos CS1-CS4 are supplied to each of the six cleaning subsystems 202a-d.

In operation, noncarbonated shampoo and any required water to properly dilute concentrated shampoo is placed into each of the storage tanks 416-430. In the embodiment of FIG. 4, four different types of shampoos are utilized, with an individual type of shampoo being stored in each of the storage tanks 416-422 and 424-430. A first type of shampoo is thus stored in the tanks 416 and 424, a second type in tanks 418 and 426, and so on. Once the noncarbonated shampoos have been diluted as required and stored in the respective tanks 416-430, the input port IN of each tank is coupled to the corresponding port 410a-d on the distribution block 410 or 412a-d on the distribution block 412. At this point, selection inputs 414 are applied to the three-way valve 406 so that CO2 from the tanks 408 is supplied through the valve and through the distribution blocks 410, 412 to each of the storage tanks 416-430. Each of the tanks 416-430 receives CO2 from the tank 408 for a required time to sufficiently carbonate the shampoo. More specifically, the tanks 416-430 until the shampoo-water mixture contained in each tank is saturated with CO2, with the amount of time required for the mixture to reach the saturation point being a function of a number of factors such as the temperature of the mixture, surface area in contact with $CO_2$, and the pressure of the $CO_2$. In one embodiment, the tank 408 provides $CO_2$ at 80 psi and each storage tank 416-430 is charged to saturation (i.e., receives $CO_2$ from the tank 408). One skilled in the art will understand how to determine the required time to properly carbonate the shampoos, and thus, for the sake of brevity, this process will not be described in more detail herein. In one embodiment of the soaping subsystem 204, each of the storage tanks 416-430 is a 5 gallon tank, and typical noncarbonated shampoos will be pre-diluted four parts water to one part shampoo, such that one gallon of noncarbonated shampoo and four gallons of water is placed into each tank for carbonation.

Once the water-shampoo mixture contained in each tank 416-430 has been sufficiently carbonated, each tank contains carbonated shampoo that is ready to be utilized in washing animals or other objects. Initially, only the storage tanks 424-430 are coupled to the check valves 432-440 to supply the carbonated shampoos CS1-CS4 to the cleaning subsystem 202 of FIG. 3. At this point, the storage tanks 416-422 are reserve tanks that may be coupled to the appropriate check valve 432-440 once the corresponding storage tank 424-430 runs out of carbonated shampoo. More specifically, when one of the storage tanks 424-430 runs out of carbonated shampoo output port OUT of this tank is disconnected from the corresponding check valve 432-440 and the output port OUT of the corresponding storage tank 416-422 is coupled to that check valve. In this way, users of the cleaning subsystems 202 may continue utilizing the subsystem once carbonated shampoo runs out and need not wait for in other storage tank 416-430 to be filled with the desired noncarbonated shampoo and carbonated.

The empty disconnected storage tank 416-430 would thereafter be once again filled with noncarbonated shampoo and diluted as required and the input port IN of this tank with once again be coupled to the appropriate port 410a-d or 412a-d on the distribution blocks 410, 412 to begin charging this tank. In this way, each of the cleaning subsystems 202 is ensured of having a supply of the required carbonated shampoos CS1-CS4. More or fewer storage tanks 416-430 may be utilized as desired, such as to provide more than four carbonated shampoos CS1-CS4. Moreover, depending upon the consumption rate of the carbonated shampoos CS1-CS4, additional distribution blocks 410, 412 and associated storage tanks 416-430 could be utilized to provide additional reserve storage tanks.

As previously mentioned, the system 200 of FIG. 2 allows the stickiness and lathering characteristics of the mixture 218 to be adjusted to achieve desired characteristics. Referring to FIGS. 3 and 4, there a number of factors that can be changed to obtain a desired stickiness and lathering characteristics of the mixture 218, including: 1) the rate of the water flow restrictor 300; 2) adjusting the carbonated shampoo needle valve 320; 3) adjusting the air flow control valves 404a-l; 4) adjusting a setting of the pressure regulator 407; and 5) adjusting a backpressure of the spray unit 374. Also note that in FIG. 4 filters (not shown) would normally be coupled to the outputs pressure regulators (not shown) in the compressor 400 and that the OUT port of each storage shampoo tank 416-430 would also typically include an in-line filter (not shown). Also, with the system 200 the water flow 210 can be less than or equal to 2.5 gallons per minute, allowing the system to comply with many water conservation regulations.

From the above description, note that when the $CO_2$ tank 408 supplies $CO_2$ to the storage tanks 416-430 the pressurized $CO_2$ not only carbonates the shampoos in each of the tanks but also functions as a propellant to cause the carbonated shampoos CS1-CS4 to flow to the appropriate cleaning subsystems 202. As a result, if the $CO_2$ tank 408 ever runs out of $CO_2$ during operation of the cleaning subsystems 202, then the carbonated shampoos CS1-CS4 will not properly flow to the cleaning subsystems as required. In this situation, the selection input 414 is applied to the three-way valve 406 to supply the pressurized air PA2 to the storage tanks instead of the $CO_2$. The pressurized air PA2 thus functions as a propellant to cause the carbonated shampoos CS1-CS4 to flow to the cleaning subsystems 202 even though the $CO_2$ tank 408 is empty. This ensures that operation of the cleaning subsystems 202 is not interrupted even though the $CO_2$ tank 408 runs out of $CO_2$. Although the distribution manifold 318 and aeration media 340, 364, 366 in the subsystem 202 of FIG. 3 are described as being part of the cleaning subsystem 202, the manifold may be considered part of the carbonated soaping subsystem 204 and the aeration media part of the aeration subsystem 206.

The system 200 may include an electronic control system (not shown) for controlling operation of the subsystems 202-206 and for controlling the overall operation of the system, as will be appreciated by those skilled in the art. Such an electronic control system could, for example, allow a user to interface with the system such as by providing required selection inputs and would also control the operation of various components in the subsystems such as solenoid valves in the cleaning subsystem 202 of FIG. 4.

In the foregoing description, one skilled in the art will understand that the figures related to the various embodiments are not to be interpreted as conveying any specific or relative physical dimensions, and that any specific or relative physical dimensions or quantities that are set forth are not to be considered limiting unless the claims expressly state otherwise. Further, examples presented in relation to the various embodiments are intended only to further illustrate certain details of the various embodiments, and are not to be interpreted as limiting the scope of the present invention.

One skilled in the art will understood that even though various embodiments and advantages of the present invention have been set forth in the foregoing description, the above disclosure is illustrative only, and changes may be made in detail, and yet remain within the broad principles of the invention. For example, types of cleaning fluids or solutions other than shampoos and objects other than the animals may be washed using the above described embodiments of the present invention. Therefore, the present invention is to be limited only by the appended claims.

What is claimed is:

1. An animal washing system, comprising:
   an injector subsystem including a water input port adapted to receive water and a shampoo port adapted to receive shampoo, the injection subsystem operable to generate a water-shampoo mixture and provide this mixture at an injector output port; and
   an aeration subsystem including an aeration input port coupled to the injector output port to receive the water-shampoo mixture, an aeration output port, and an aeration media adapted to receive pressurized air, the aeration media being positioned between the aeration input and output ports to aerate a flow of the water-shampoo mixture and thereby generate an aerated-water-shampoo mixture having desired foaming characteristics that is provided at the aeration output port.

2. The animal washing system of claim 1 further comprising a soaping subsystem operable to generate and store a plurality of carbonated shampoos, and operable in response to selection inputs to provide a selected one of the carbonated shampoos to the shampoo port of the injector subsystem.

3. The animal washing system of claim 1 wherein the aeration subsystem further a second aeration input port including a second air diffusion media adapted to receive pressurized air.

4. The animal washing system of claim 3 wherein the aeration subsystem includes a compressor.

5. The animal washing system of claim 4 further comprising a flexible tube and a spray unit coupled to the aeration output port.

6. An animal washing system, comprising:
a an aeration subsystem operable to provide pressurized air;
a soaping subsystem operable to provide a selected one of a plurality of shampoos responsive to selection inputs; and
a cleaning subsystem including an output port, a water input port adapted to receive water, a soaping port coupled to the soaping subsystem to receive the selected shampoo, and an aeration port including an aeration media coupled to the aeration subsystem to receive the pressurized air, the cleaning subsystem operable in a soaping mode to combine the water and the selected shampoo to form a water-shampoo mixture and to flow the combined water-shampoo mixture over the aeration media to aerate the water-shampoo mixture and generate an aerated water-shampoo mixture having desired foaming characteristics, and to provide the aerated water-shampoo mixture from the output port.

7. The animal washing system of claim 6 wherein the cleaning subsystem further comprises a rinsing port adapted to receive a second water flow, the cleaning subsystem operable in the rinsing mode to provide the water flow from the output port using substantially the second water flow.

8. The animal washing system of claim 6 wherein the soaping subsystem is further operable to generate and store a plurality of carbonated shampoos, and is operable to provide a selected one of the carbonated shampoos responsive to the selection inputs.

9. The animal washing system of claim 6 wherein the cleaning subsystem further includes a plurality of aeration ports, each aeration port including a respective aeration media adapted to receive the pressurized air.

10. The animal washing system of claim 6 wherein the aeration subsystem includes a compressor.

* * * * *